Dec. 20, 1955 K. L. BURGENER 2,727,948
DISCRIMINATING LINK CIRCUIT
Filed Oct. 14, 1950
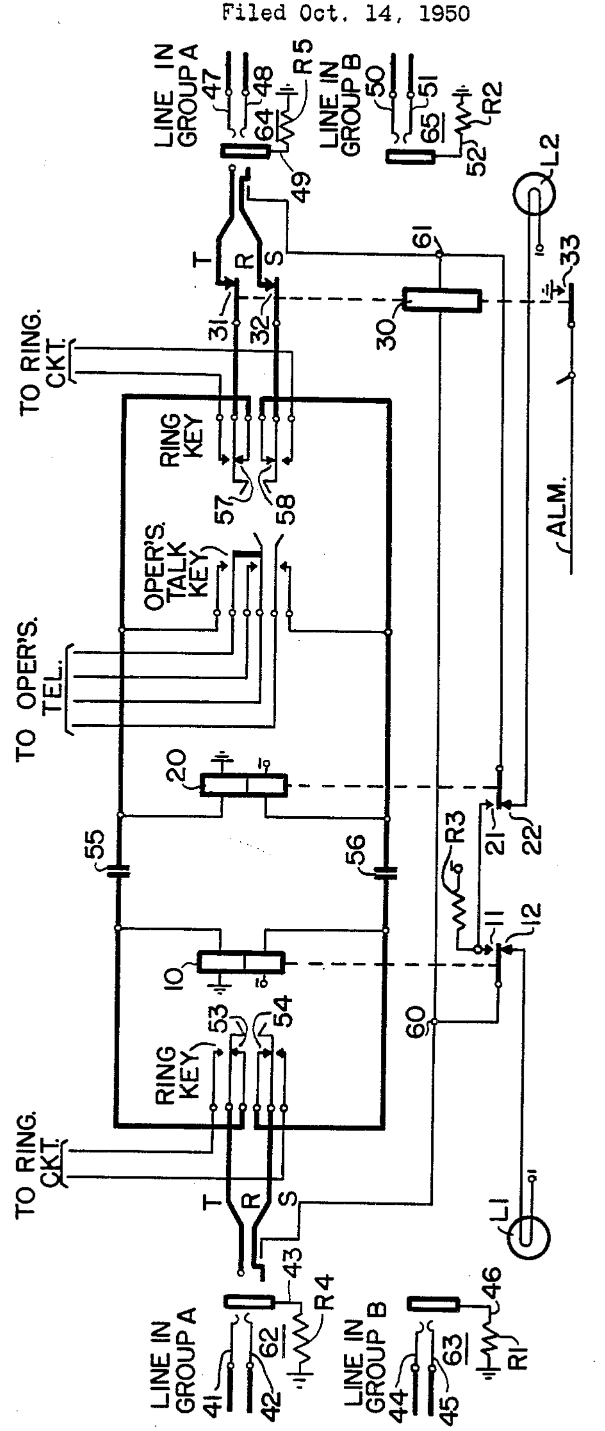
INVENTOR.
KARL L. BURGENER
BY Wm. Walter Owen.
ATTORNEY United States Patent Office 2,727,948
Patented Dec. 20, 1955

2,727,948

DISCRIMINATING LINK CIRCUIT

Karl L. Burgener, Villa Park, Ill., assignor to Automatic Electric Laboratories, Inc., Chicago, Ill., a corporation of Delaware Application October 14, 1950, Serial No. 190,227
5 Claims. (Cl. 179—51)

This invention relates to telephone switchboards in general and to connecting link circuits therefor in particular; and still more particularly to a discriminating type of link circuit that will be effective when connecting lines within either of two groups of lines but will be ineffective when connecting a line from one group to a line from the other group.

Accordingly, the main object of the invention is to provide in a telephone switchboard a link circuit that will be effective for establishing electrical connections between the lines of one group and also for establishing electrical connections between the lines of a second group, while barring an electrical connection between the lines of different groups if through inadvertence or otherwise a connection is attempted therebetween.

Briefly explained, the sleeves of the jacks constituting one group are marked in one manner and the sleeves of the jacks in the other group are marked in a second manner. This circuit can then establish a connection between two of the lines marked in the first manner or between two of the lines marked in the second manner, but if an attempt is made to use the link circuit to connect a line marked in the first manner to a line marked in the second manner, or vice versa, a discriminating relay is operated to prevent the completion of such a connection. Thus two separate exchanges may be installed in the same switchboard.

The invention will be more fully understood from the following description taken in connection with the accompanying drawing, which illustrates diagrammatically one embodiment thereof.

While the illustrated embodiment of the invention shows a manual switchboard using cord circuits for connecting links it is to be understood that the arrangement can be applied to switchboards of other types without departing from the true scope and spirit of the invention.

Referring now in detail to the drawing the sleeves of the jacks in group A are connected to ground through resistance, such as the resistances R4 and R5, and the sleeves of the jacks in group B are connected to ground through resistance, such as resistances R1 and R2. R4 and R5 are low resistance, in the nature of five ohms each. R1 and R2 are high resistance, in the nature of 300 ohms each. The low resistances R4 and R5 associated with the sleeves 43 and 49 respectively are provided so that the well known "tip busy test" can be made if this arrangement is used in a switchboard on which the jacks are multipled and are accessible to more than one operator. In a switchboard on which the jacks make only one appearance direct ground could be connected to the sleeves 43 and 49 as no busy indication would be required. For a complete understanding of the invention four connections will be considered, namely; from a line in group A to another line in group A; from a line in group B to another line in group B; from a line in group A to a line in group B; and finally from a line in group B to a line in group A.

Considering now the establishment of a connection between two lines in group A, responsive to the origination of a call on the line terminating in jack 62 a line signal lamp (not shown) is illuminated. The operator will insert the answer plug (on the left in the drawing) in the calling line's jack 62. Relay 10 will then energize over the following path: ground, upper winding of relay 10, contacts 53, tip conductor T of answer plug, line 41, over subscriber's loop, line 42, ring conductor R of the answer plug, contacts 54, through lower winding of relay 10 to battery. Relay 10, in closing contacts 11, causes battery through resistance R3 to be placed on the sleeve in order to busy the associated line. Discriminating relay 30 now operates over the following path: ground on sleeve 43 through resistance R4, through relay 30, contacts 22, lamp L2 to battery. Relay 30 in opening contacts 31 and 32 opens the eventual talking circuit. The operator then depresses the associated talk key in order to make connection with the calling subscriber. Upon ascertaining the desired number, the operator inserts the calling plug (on the right in drawing) in the jack 64 associated with the called station—another line in group A in the instant considered connection. Discriminating relay 30 now deenergizes responsive to the insertion of the calling plug as ground through resistance R5 is connected to the right terminal and the resistances of R4 and R5 are approximately equal. Under these conditions practically no current will flow through the coil of the relay 30. Contacts 31 and 32 therefore close. The operator may then operate and restore the ring key (on the right in the drawing) in order to signal the called party. Responsive to answering, relay 20 operates over the following path: ground, through upper winding of relay 20, contacts 57, 31, tip conductor T of calling plug, line 47, over called subscriber's loop, line 48, ring conductor R of calling plug, contacts 32, 58, through lower winding of relay 20 to battery. Relay 20 in closing contacts 21 performs no useful function at this time. The connection is now established for subsequent conversation by the two parties in group A over the following path: calling subscriber on the left, line 41, tip conductor T of answer plug, contacts 53, condenser 55, contacts 57, 31, tip conductor T of calling plug, line 47, over called subscriber's loop, line 48, ring conductor R of calling plug, contacts 32, 58, condenser 56, contacts 54, ring conductor R of answer plug, line 42, to the calling subscriber's loop. Battery at relay 10 supplies talking current for the calling party while battery at relay 20 supplies talking current for the called party. Lamps L1 and L2 illuminate when the calling and the called parties, respectively, release their connection. When the calling party releases, relay 10 deenergizes resulting in the closing of contacts 12. Lamp L1 will then illuminate over the following path: ground on sleeve 43, contacts 12, lamp L1 to battery. When the called party releases, with the resultant deenergization of relay 20, the operator will likewise be apprised of that condition by the illumination of lamp L2 over the following path: ground on sleeve 49, contacts 22, lamp L2, to battery.

Considering now a connection between two lines in group B, namely between the lines terminating in jacks 63 and 65, it can be seen that the only difference in the operation from that hereinbefore described is that relay 30 will now be prevented from operating by reason of the ground on each side through identically higher resistances—ground through resistance R2 and sleeve 52 on one side and ground through resistance R1 and sleeve 46 on the other side. The resistance of lamp L2 and resistance R3 must be approximately equal so that points 60 and 61 in the circuit will be at the same potential in order to prevent discriminating relay 30 from operating. Thus this cord circuit may establish an electrical connection between two lines within group B. It may be said at this point that R1 and R2 are of such value that when placed in series with lamps L1 and L2 respectively, at the time the parties release, will not prevent said lamps from illuminating.

Considering now a connection from a line in group A to a line in group B, relay 10 will operate as hereinbefore described responsive to insertion of the answer plug in the calling party's jack 62 and relay 30 will also operate at that time over the circuit hereinbefore described. However, when the operator inserts the calling plug in a jack 65 associated with a line in group B, relay 30 will not restore. Relay 30 will have ground connected to its left terminal through resistance R4 and to its right terminal through resistance R2. The resistance values of R4 and R2 must, of course, be of such values that sufficient current will be allowed to flow through resistance R4 and relay 30 to maintain it energized. The talking circuit is now open at contacts 31 and 32 so that any communication to a subscriber in group B is prevented. Relay 30, in operating contacts 33, closes an obvious circuit to an alarm—an indication to the operator that the cord circuit is not completing the connection.

Finally in considering a connection from a line in group B to a line in group A, relay 30 will operate responsive to the insertion of the answer plug in the jack 63 associated with the calling line in group B over the following path: ground, resistance R1, sleeve 46, relay 30, contacts 22, lamp L2, to battery. Now when the calling plug is inserted into the jack 64 associated with the called line in group A relay 30 will remain energized over a new path as follows: ground on sleeve 49, resistance R5, relay 30, contacts 11, resistance R3 to battery. It therefore can be seen that as in the case of a connection from group A to group B a connection from group B to group A will likewise be ineffective in establishing communication therebetween.

Having described my invention in detail, what I claim and desire to have protected by issuance of Letters Patent of the United States is:

1. In a telephone switchboard, a first group of lines and a second group of lines terminating thereat, the sleeve conductor of each line in said first group connected to ground through a low resistance and the sleeve conductor of each line in said second group connected to ground through a higher resistance, a cord circuit, and a relay for controlling the effectiveness of said cord circuit, means for controlling said relay when said cord circuit is connected between two lines having dissimilar resistance connections to ground to cause it to prevent the electrical connection between a line in said first group and a line in said second group, and means for controlling said relay when said cord circuit is connected between two lines having similar resistance connections to ground to effect a complete electrical connection therebetween.

2. In a telephone switchboard, a first group of lines and a second group of lines terminating thereat, the sleeve conductor of each line in said first group connected to ground through a low resistance and the sleeve conductor of each line in said second group connected to ground through a higher resistance, a cord circuit, a discriminating relay for controlling the effectiveness of said cord circuit, a first source of potential, means for connecting said first source of potential to operate said discriminating relay, a second source of potential, means for connecting said second source of potential to operate said discriminating relay, said discriminating relay having an equal potential on either side when said cord circuit is connected between two lines in the same group thereby allowing said cord circuit to remain in its normal effective condition for completing a connection; said discriminating relay operated, when said cord circuit is connected between a calling line in said first group and a called line in said second group, over a circuit including the sleeve associated with said calling line in said first group connected to ground through a low resistance and said first potential source, thereby causing said cord circuit to be ineffective in completing a connection; said discriminating relay also operated, when said cord circuit is connected between a calling line in said second group and a called line in said first group, over a circuit including the sleeve associated with said called line in said first group connected to ground through a low resistance and said second potential source, thereby causing said cord circuit to be ineffective in completing a connection.

3. In a telephone system, a plurality of groups of lines, markings for said lines, the marking potentials connected to the lines of one group being different from the marking potentials for the lines of another group, a cord circuit having access to said lines for extending calls therebetween, a relay in said cord circuit, means including the answer end of said cord circuit for connecting said relay to the marking potential of a calling line and for operating said relay by means of said marking potential in response to said calling line being answered, disabling means in said cord circuit operated by the operation of said relay for disabling said cord circuit, means including another dissimilar marking potential for maintaining said relay operated and thereby operating said disabling means, when said call is extended to a called line of another group, and means including an identical marking potential for restoring said relay and thereby rendering said disabling means ineffective, in case said call is extended to a called line in the same group as the calling line, and having a marking potential identical with that of said calling line.

4. In a telephone system, a plurality of groups of lines, a control conductor for each line, a cord circuit having access to all groups of lines, discriminating means in said cord circuit, means for completing a connection from said discriminating means to the control conductor of a calling line to thereby operate said discriminating means whenever a call is answered by connecting said cord circuit thereto, disabling means in said cord circuit controlled by said discriminating means to open the talking circuit through said cord circuit, means for completing another connection from said discriminating means to the control conductor of a called line to which a call is extended by said cord circuit, and means including said other connection to the control conductor for restoring said discriminating means and thus rendering said disabling means ineffective to thereby maintain the talking circuit closed whenever a calling line is extended to another line in the same group, and means for maintaining said discriminating means operated and said disabling means effective to open the talking circuit in case a calling line is extended to a called line of another group.

5. In a telephone system, a plurality of groups of lines, a control conductor for each line, a cord circuit having access to all groups, a discriminating relay in said cord circuit, means for completing a connection from said discriminating relay to the control conductor of a calling line to thereby operate said relay whenever a call is answered by connecting said cord circuit thereto, means for connecting said discriminating relay to the control conductor of a called line whenever a call is extended by connecting said cord circuit to the called line, marking potentials for said lines, the marking potentials for the lines of one group being different from the marking potentials for the lines of another group, disabling means in said cord circuit operated by the operation of said discriminating relay for disabling the talking circuit of said cord circuit, said discriminating relay restoring upon the existence of equal potentials on each side of said relay placed thereon by identical marking potential, in case a calling line is extended to another line in the same group, so as to render said disabling means ineffective and thereby closing said talking circuit; said discriminating relay being maintained operated upon the existence of unequal potentials on either side of said relay placed thereon by dissimilar marking potentials, in case a calling line is extended to a called line of another group to thereby maintain said disabling means operated for opening said talking circuit.

References Cited in the file of this patent

UNITED STATES PATENTS

| | | |
|---|---|---|
| 1,487,361 | Polinkowsky | Mar. 18, 1924 |
| 1,492,995 | Lubberger | May 6, 1924 |
| 2,577,759 | Henquet et al. | Dec. 11, 1951 |